Nov. 13, 1928.
W. NICHOLAS
AUTOMOBILE BUMPER
Filed Nov. 12, 1926
1,691,492
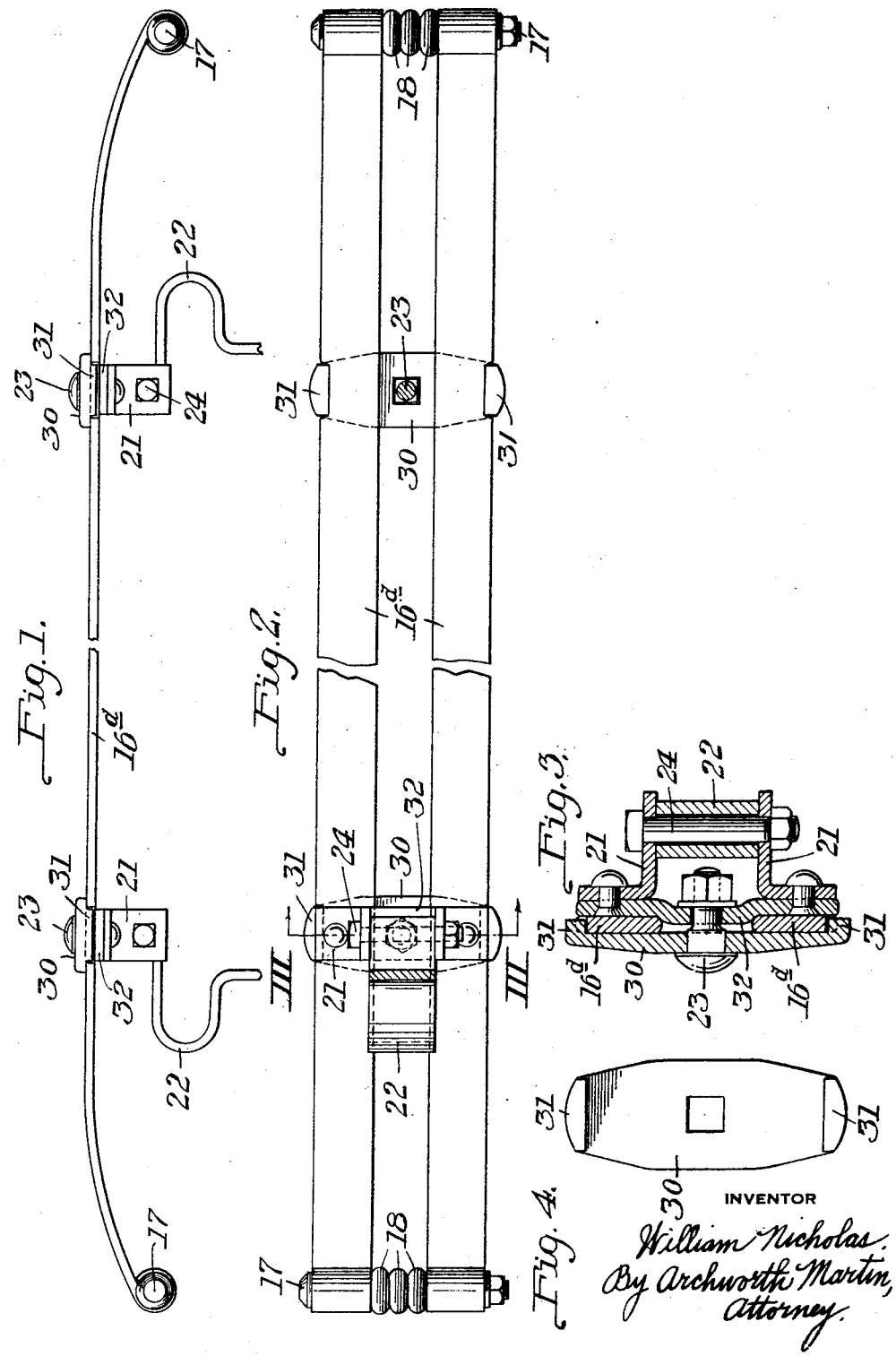
INVENTOR
William Nicholas.
By Archworth Martin,
Attorney.

Patented Nov. 13, 1928.

1,691,492

UNITED STATES PATENT OFFICE.

WILLIAM NICHOLAS, OF BELLEVUE, PENNSYLVANIA, ASSIGNOR TO UNITED STATES CHAIN & FORGING COMPANY, OF PITTSBURGH, PENNSYLVANIA, A CORPORATION OF DELAWARE.

AUTOMOBILE BUMPER.

Application filed November 12, 1926. Serial No. 147,906.

My invention relates to automobile bumpers, and particularly to means for connecting the same to supporting arms or brackets that are secured to a vehicle frame.

One object of my invention is to provide an improved form of fitting for preventing shifting of an impact-receiving bar, relative to the fitting to which it is connected.

Another object of my invention is to provide means for holding impact-receiving bars and a fitting in relative rigid positions, without the necessity of drilling holes in the bar and with consequent weakening of the same.

Still another object of my invention is to generally simplify and improve bumper bar supporting devices.

One of the various forms which my invention may take is shown in the accompanying drawing, wherein Figure 1 is a plan view of a portion of a bumper structure embodying my invention; Fig. 2 is a rear elevational view thereof; Fig. 3 is a view taken on the line III—III of Fig. 2, on an enlarged scale; and Fig. 4 is a rear elevational view of the face plate of Fig. 1, on an enlarged scale.

While I hereinafter show and describe my invention as applied to a bumper structure composed of a plurality of flexible impact-receiving bars, it will be understood that the invention is applicable to impact-receiving bars of various other forms, whether in single or multiple arrangement and whether flexible or rigid, but the invention is particularly useful in connection with impact-receiving bars of flexible material, such as spring steel, since upon bending or deformation of such bars by reason of impacts imposed thereon, especially against their mid portions, there will be a tendency for such bars to slide within their supporting fittings, thus rendering them unsymmetrical with respect to the front of the vehicle. Another, and perhaps a more important, objection to this sliding movement resides in the fact that the supporting arms or their fixtures are normally more or less firmly held in alined position as shown in Figs. 1 and 2, so that if the mid portion of the bar is deflected, and the bar caused to slide within the fittings, a binding action takes place as between the fittings and the bars which prevents the bar from sliding back to normal position from the deflected position.

Heretofore, attempts have been made to maintain a proper rigid relationship between the bars and their fittings by securing the fittings, through suitable connections to the ends of the bars. This is not always convenient nor practical, since it increases the weight and expense of the bar and may be otherwise objectionable. If the impact-receiving bars are drilled in order to procure a proper tying effect between the bars and their fittings, such drilling seriously weakens the bar.

Referring to the structure shown in Figs. 1 to 4, a portion of two impact-receiving bars 16$^d$ is shown, which have eye portions in their outer ends, through which tie bolts 17 extend. Spacer rings 18 are interposed between adjacent edges of the bars 16$^d$, but it will be understood that the bars may be fastened together in any other suitable manner. The groups or sets of fittings by which the bars are attached to a motor vehicle (not shown) each comprises a face plate 30; a back plate 32; angle bars 21 riveted to the back plate; a bracket arm 22; a tie bolt 23 by means of which the plates 30 and 32 are held in tight engagement with the sides of the bars 16$^d$, and a pivot bolt 24 that extends through an eye or loop formed in the outer end of the bracket arm 22 and the horizontal flanges of the angle plates 21.

As shown more clearly in Fig. 1, the fittings are connected to the bars intermediate their ends and in such spaced relation that arms 22 may be readily secured to the side frames of a motor vehicle (not shown) in any suitable manner.

The face plate 30 has upper and lower inturned ends or flanges 31 which fit within depressions formed in the edges of the impact-receiving bars 16$^d$, and is thereby rigidly held against relative movement in a direction longitudinally of the bars. The back plate 32 is bent forwardly at its mid portion to serve as a spacer for the bars 16$^d$, the lugs 31 thus serving both to prevent slippage of the bars in the fitting and as tie members to prevent spreading of the bars in a vertical plane.

I claim as my invention:—

1. Bumper structure comprising a pair of impact-receiving bars, one of which is recessed in its outer edge, and a fitting member clamped to said bars and having a lateral projection complemental to the said recess, for holding said bars against relative movement in a longitudinal direction.

2. Bumper structure, comprising a pair of vertically spaced impact bars, each of which has a recess in its outer edge, and a fitting member engaging said recesses.

3. Bumper structure comprising a pair of vertically-spaced impact bars, having recesses in their outer edges, and a front plate and a back plate between which said bars are clamped, one of said plates being provided with flanges overlying the remote edges of the bars and fitting within such recesses.

4. Bumper structure, comprising a pair of vertically-spaced impact bars one of which has a recess in its outer edge, and a fitting member secured to said bars and having an offset portion fitting within said recess.

5. Bumper structure comprising a pair of yieldable impact-receiving bars in vertically spaced relation, a front clamping plate having its flanges overlying the remote edges of said impact receiving bars, a back clamping plate, means on one of said plates for engaging the adjacent edges of the bars and to hold them spaced apart, a bolt for holding said plates in clamping engagement with the sides of the bars, angle plates secured to the back plate and each having one of its flanges extending in a horizontal plane and in vertically spaced relation to the corresponding flange of the other angle plate, and means for pivotally connecting a bracket arm to said angle plates.

In testimony whereof I, the said WILLIAM NICHOLAS, have hereunto set my hand.

WILLIAM NICHOLAS